United States Patent [19]

Bloks

[11] Patent Number: 5,751,721
[45] Date of Patent: May 12, 1998

[54] SYSTEM FOR ADJUSTING TIMING OF OUTPUT DATA IN RESPONSE TO POTENTIAL DISCONTINUITIES IN A TIMING SIGNAL

[75] Inventor: Rudolf H. J. Bloks, Eindhoven, Netherlands

[73] Assignee: U.S. Philips Corporation, New York, N.Y.

[21] Appl. No.: 623,648

[22] Filed: Mar. 28, 1996

[30] Foreign Application Priority Data

Mar. 29, 1995 [EP] European Pat. Off. ............ 95200784

[51] Int. Cl.$^6$ ............................................. H04J 3/06
[52] U.S. Cl. ................ 370/509; 370/516; 395/200.19; 375/357
[58] Field of Search ............................ 370/362, 363, 370/516, 517, 518, 519, 503, 507, 509, 514; 375/357; 340/825.2; 395/200.19

[56] References Cited

U.S. PATENT DOCUMENTS

| 5,052,029 | 9/1991 | James | 375/107 |
| 5,408,506 | 4/1995 | Mincher | 375/356 |
| 5,566,174 | 10/1996 | Sato | 370/84 |
| 5,633,871 | 5/1997 | Bloks | 370/471 |

FOREIGN PATENT DOCUMENTS 942019456  5/1995  European Pat. Off. .

OTHER PUBLICATIONS

IEEE P1394 Standard, Draft 8.0v2, Jul. 7, 1995.

*Primary Examiner*—Douglas W. Olms
*Assistant Examiner*—Matthew C. Phillips
*Attorney, Agent, or Firm*—Anne E. Barschall

[57] ABSTRACT

A system associates a time-stamp with data inputted at its input, specifying an instant with a predetermined delay after receiving the data. The system outputs said data at an output according to the time-stamp. Inputting and outputting is timed by different clocks, which are periodically synchronized. At certain times the source of synchronization may change, potentially causing a discontinuity in synchronized time. The system contains potential discontinuity signalling means, for signalling a potential discontinuity in a progression of the clocked time. The predetermined relation is corrected when such a potential discontinuity is signalled for an instant between inputting and outputting the data.

12 Claims, 2 Drawing Sheets

SYSTEM FOR ADJUSTING TIMING OF OUTPUT DATA IN RESPONSE TO POTENTIAL DISCONTINUITIES IN A TIMING SIGNAL

BACKGROUND OF THE INVENTION

The invention relates to a system with an input, an output and timing means, for associating a time-stamp with data inputted at the input, and outputting said data at the output when a time indicated by the timing means is in a predetermined relation with the time-stamp. Such a system is described in unpublished European Patent Application number 94201945.6 (PHN 14.935 EP-P).

Such a system for example provides a constant time delay between inputting and outputting, as measured against a time measured by the timing means. This constant time delay cannot be guaranteed if the progression of the time indicated by the timing means can exhibit unpredictable discontinuities. This is because the time of inputting and the time of outputting cannot then be measured with respect to the same time scale.

It is an object of the invention to make it possible to overcome the effects of such discontinuities.

SUMMARY OF THE INVENTION

The system according to the invention is characterized, in that it contains potential discontinuity signalling means, for signalling a potential discontinuity in a progression of the time indicated by the timing means and time correction means, for correcting the predetermined relation when a potential discontinuity is signalled for an instant between inputting and outputting the data. In this way each potentially disturbing effect is signalled and the timing relation is corrected.

In an embodiment of the system according to the invention the timing means contains an input timer register and an output timer register, incrementing means for periodically and individually incrementing these registers, and a plurality of synchronizing means, each for synchronizing the input timer register with the output timer register, the potential discontinuity signalling means being arranged for signalling the potential discontinuity when it detects that one of the plurality of synchronizing means takes over synchronizing from another one of the plurality of synchronizing means. Thus there are several different sources of synchronization, for example different apparatuses that may become time master in a P1394 bus system. When the source of synchronization changes a discontinuity will potentially occur. Thus, in P1394 there will be no discontinuity if the new time master was previously synchronized to the old time master, but there will be a discontinuity for example when the new time master was just switched on prior to becoming the time master.

The system according to the invention has a further embodiment containing a transmitter, a receiver and a bus connecting the transmitter and the receiver and at least one other apparatus, the transmitter containing the input and the input timer register, the receiver containing the output and the output timer register, the data and the time-stamp being transmitted from the transmitter to the receiver via the bus, the transmitter also transmitting a code indicating a number of potential discontinuities signalled prior to inputting the data via the bus in association with the time-stamp. Thus the invention is applied to a bus system. In this system, for example a P1394 bus system, the data will experience a variable delay depending on the time between inputting the data the time the bus is available. This delay is then compensated by further delaying the data in the receiver until the predetermined time relation occurs. By transmitting both the time stamp and the code via the bus the receiver is enabled to correct the timing relation.

In a further embodiment of the system according to the invention the receiver contains the time correction means, which are arranged for comparing the code with a local count of potential discontinuities, and for correcting the predetermined relation when the local count does not match the code.

In a further embodiment of the system according to the invention the time correction means contain a discontinuity store, for storing a continuity amplitude, representing the amplitude of an effect on the time progression of at least a most recently signalled potential discontinuity, and for correcting the predetermined relation according to this amplitude. The actual amplitude of the discontinuity (which may be zero if it turns out that the potential discontinuity did not materialize) cannot be measured until the synchronization is executed for the first time, i.e. after the potential discontinuity is signalled. By storing the measured discontinuity the relation between the time stamp and the time of outputting can be adjusted when inputting and outputting is separated by one ore more potential discontinuities, such that the actual time relation between inputting and outputting is not affected by the discontinuities.

DETAILED DESCRIPTION OF THE INVENTION

Figure 1:
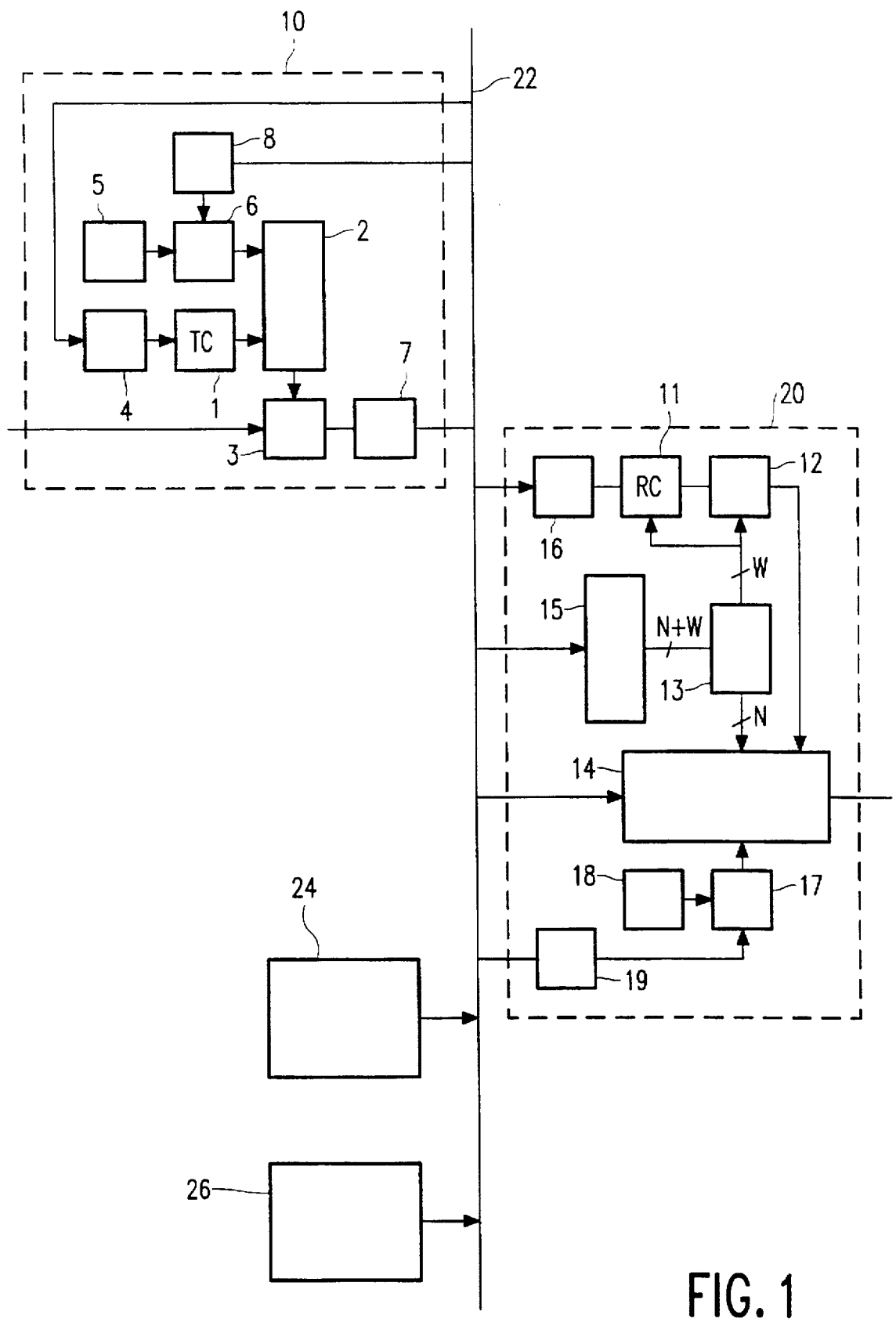
FIG. 1 shows a system according to the invention.

The IEEE P1394 standard issued by the IEEE defines an architecture for a digital communication network with multiple nodes capable of communicating at a number of different bit rates without the need for global distribution of a common system clock signal. In principle each node has its own local bit clock generator which is not synchronized or locked in any way to other bit clock generators in the network. A base clock rate of 24.576 MHz+/−100 ppm is defined, from which the 3 possible bit clock rates are derived by multiplication of this frequency by a factor of 4, 8 or 16.

The P1394 architecture also defines a common time base mechanism used to introduce the notion of a global bus time. This is done using the so called Cycle Timer Register which increments according to some specific rules at the base clock rate. However, because none of these base clocks are locked, the values in the Cycle Timer Registers may diverge over time even if they were originally all equal. To keep these values in synchronization one of the nodes is appointed Cycle Master and this node has the responsibility to periodically (on average once every 125 microseconds) broadcast a packet on the network containing the actual value of its own Cycle Timer Register. All other nodes receiving this packet have the obligation to update the contents of their own Cycle Timer Register according to the received value.

The operation of the P1394 bus is such that access to the bus cannot be guaranteed at any desired time. As a consequence data transported over this bus will experience a delay which is not fixed. This delay jitter is of such magnitude that some types of data (such as MPEG-2 Transport Streams) cannot be transported without taking some special precautions. One type of precaution is to attach a time stamp to each packet before transmission and to use the stamp at the receiver to artificially create a constant transport delay. A detailed description of such a mechanism can be found in European Patent Application number 94201945.6 (PHN 14.935 EP-P).

In this method the value of the stamp is extracted from the value of the Cycle Timer Register at the transmitter node at the time when the packet was delivered to the transmitter by its host system. To create a constant transport delay the method requires any packet to be stored at the receiver until the bus time (=value in the Cycle Timer Register) at the receiver equals the value of the stamp attached to that packet. Buffering is also required at the transmitter side since access to the bus cannot be granted to the same transmitter all the time.

This method of time stamping works fine as long as there are no exceptions on the bus. There is one particular situation where this method will generally fail and that is shortly after the occurrence of a bus reset sequence. A bus reset is invoked whenever new nodes are added to the network or existing nodes are removed from it. The bus reset sequence includes the selection of a network root node, which will also function as a Cycle Master. If this happens to be a new node just added to the bus then its selection as a Cycle Master may introduce a discontinuity in the bus time, henceforth called a time base change. This is undesirable since it will also invalidate all stamp values attached to the packets currently waiting in any buffer at the transmitter and the receiver. If nothing is done about this, then in the worst case it will create buffer overflow in the receiver because packets are not delivered at the correct time but much later instead. For example if the CTR jumps back 16 msec, then a stamp that was originally pointing 100 microseconds ahead is now pointing 16.1 msec ahead and the corresponding packet will remain waiting in the delivery buffer for that amount of time.

This invention claims a method by which it is possible to detect by inspection of a time stamp attached to a packet whether or not the stamp may be invalid because of an intermediate time base change. It also provides a method based upon which action may be taken to adjust each individual stamp value in order to compensate for the time base change, even if more than 1 time base change occurred in rapid succession.

The time stamp attached to a packet is extended with a new field of some fixed width W (number of bits) which shall be referred to as the TB field (Time Base).

Whenever a new time stamp is created in a transmitter by sampling (and perhaps subsequent processing of) a Cycle Timer Register value, the TB field assumes the value of a W bit counter TC located in the transmitter. This TB value together with the original time stamp are now both attached to the packet and transmitted. The value of the W bit counter TC is set to zero whenever the transmitter is initialized. The value of the W bit counter TC is incremented by one whenever a bus reset or other potentially time base changing exception is detected by the transmitter node.

FIG. 1 shows a simplified diagram of a system according to the invention. The system contains a transmitter 10, a receiver 20, a bus 22 connecting the transmitter 10 and the receiver 20 and two other apparatusses 24, 26.

The transmitter 10 is a time stamping transmitter. The transmitter 10 has a bus_reset detector 4, coupled to a bus$_{13}$ reset input of a counter TC 1. The counter 1 has an output coupled to a stamp formatting unit 2. The transmitter 10 contains a clock generator 5 coupled to a cycle timer register 6. A cycle timer update unit 8 is connected to a set inoput of the cycle timer register 6. An output of the cycle timer register 6 is connected to a time stamp input of the stamp formatting unit 2. The stamp formatting unit is coupled to a stamp attachment unit 3. Furthermore, the transmitter 10 has a packet input for application data packets connected to the stamp attachment unit 3, which feeds a stamped packet to a transmit buffer 7.

In operation apparatus 24 or 26 may be time master. Cycle timer register 6 contains a count of a number of clock cycles of the clock generator 5. When the cycle timer update unit 8 receives the packet on the network containing the actual value of the Cycle Timer Register of the cycle master it updates the content of the Cycle Timer Register 6.

The stamp attachment unit 3 receives each time a packet and attaches an attachment. The attachment is composed from the time stamp (N bits long e.g. N=20) received on the time stamp input and the count of the counter 1 (W bits long e.g. W=2). The packet is stored with attachment in the transmit buffer 7 until it is transmitted via the bus 22.

The receiver 20 is a time stamp based receiver. The receiver has a bus reset detector connected to a bus_reset input of a counter RC 11 which has an output coupled to a comparator 12. The receiver 20 has an attachment input for receiving attachments which have been recovered from packets cum attachment received on the bus 22. This attachment input is coupled to a stamp processing unit 13 which feeds the count value in the attachment to the comparator 12 and the timestamp to a delivery system 14. The receiver 20 also contains a clock generator 18 coupled to a cycle timer register 17 and a cycle timer unpdate unit 19 connected to a preset input of the cycle timer register 17.

In operation cycle timer register 17 contains a count of a number of clock cycles of the clock generator 18. When the cycle timer update unit 19 receives the packet on the network containing the actual value of the Cycle Timer Register of the cycle master it updates the content of the Cycle Timer Register 17.

The comparator 12 compares the received count value with the count value in the counter 11. If these values are equal the delivery system 14 delivers the packets received from the bus 22 normally at the time determined by the time stamps, that is, it delivers a packet when the associated time stamp matches the content of the timer register 17, which contains a count of a number of clock cycles of the clock generator 18.

When a new link is first initialized the receiver uses the TB field value attached to the first received packet to synchronize counter RC 11 to counter TC 1 and this stamp is marked valid. (Alternatively counter RC 11 could be initialized to 0, similar to the counter TC 1). For each subsequent packet the value of the attached TB field is compared to the value of the counter RC 11 and the time stamp attached to that packet is marked valid if and only if these two values are equal. Whenever the detector 4 in the receiver 1 detects a bus reset or other potentially time base changing exception, it increments the counter RC 11 by one.

Up to $2^w-1$ cascaded resets can be handled by this method. This can be explained as follows: When the time base changes, all stamps already stored with packets remain the same. It will take some time before all these packets have been completely processed and all time stamps relating to the old time base have been removed from the system. If multiple bus resets occur in rapid succession it is possible that there are packets in transit based on each intermediate time base. A receiver can only decide unambiguously to which time base a time stamp refers if the number of time bases for which packets may still be in transit is less than 2w.

Handling of invalid time stamps can be done in many different ways, depending on desired accuracy of the output stream timing and allowed system complexity. The extremes are:

The simplest way to handle such stamps is to disregard them and deliver packets with invalid time stamps immediately, or as soon as possible. Hardware cost is minimal, but the early delivery of application packets to the host system may cause buffer problems there.

A rather complex but also very good way to handle invalid stamps is to adjust their value just before using them in order to compensate for the time base change. To do this the receiver must keep track of all $2^w-1$ previous time bases, or the sizes of the discontinuities. When a stamp arrives based on an earlier time base, the receiver computes the difference between that time base and the current one and adds it to the received stamp. The stamp is then valid for normal use.

Figure 2:
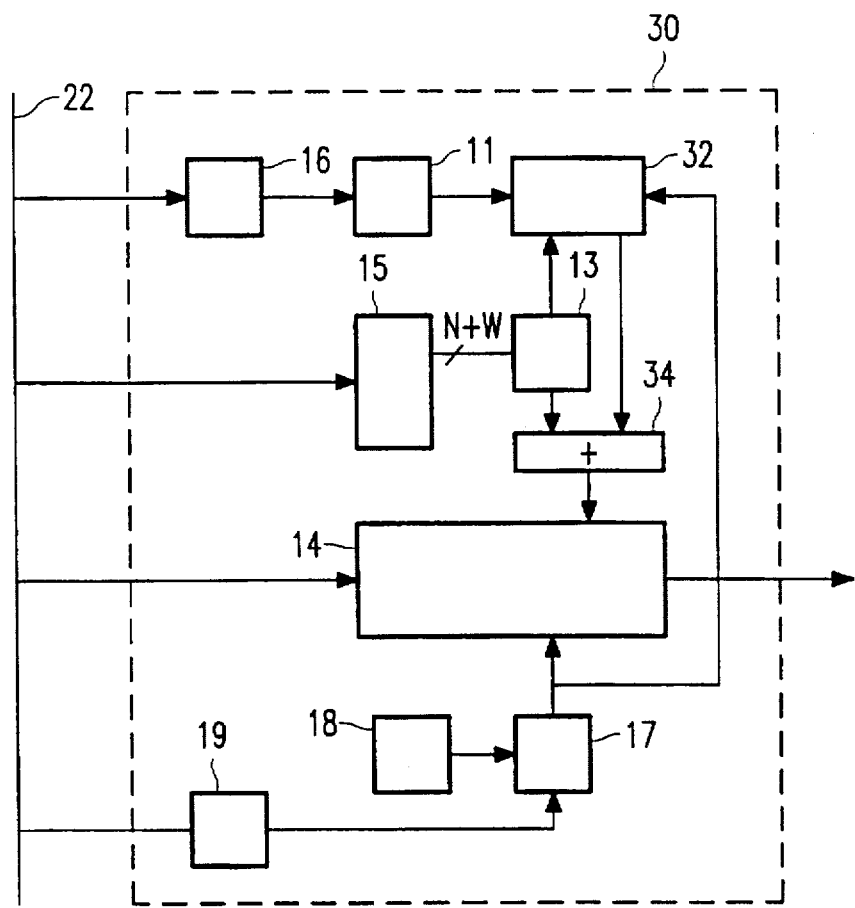
FIG. 2 shows a receiver according to the invention.

FIG. 2 exemplifies this solution. FIG. 2 shows a receiver 30 connected to the bus 22. Components which are similar to the components of receiver 20 of FIG. 1 have been indicated by the same reference numerals. Instead of comparator 12 contains a time stamp memory system 32 and an adder 34.

In operation, for each packet time stamp memory system 32 receives the value of the attached TB field and the value of the counter RC 11. The TB field and the value of the counter are compared. On the basis of this coparison a time base difference is retrieved from a memory and applied to adder 34. Adder 34 adds this difference to the time stamp of the packet. Time stamp delivery system 14 delivers the packets normally as determined by the time stamps, that is, it delivers a packet when the time stamp output from the adder matches the content of the timer register 17.

Whenever the detector 4 in the receiver 1 detects a bus reset or other potentially time base changing exception, the difference (the size of the discontinuity of the time base) between the current content of the timer register 17 and its new content after the potential time base change is stored in the time stamp memory system 32. The time stamp memory system 32 maintains difference for the last $2^w-1$ potential time base changes.

For most purposes, the value of W need not be very large. A value of W=2 for example makes it possible to account for three time base changes during the time interval that a packet is buffered. In this case only three sizes of discontinuities need to be stored. Even W=1 (a single bit count) may suffice when it is unlikely that more than one time base change occurs in the maximum length time interval during which a packet is buffered.

A bus reset will occur for example when a new apparatus (for example apparatus 24 or 26) is attached to the bus, or when the power of such an apparatus is switched on (to save power apparatuses in a consumer system are preferably switched off when they are not used). The bus reset is effected by transmitting a bus reset message on the bus. All apparatuses connected to the bus can detect this message, and then increment the content of their respective time base counter, to indicate that the bus time may have changed discontinuously. (After a reset it is not certain that the bus time will change discontinuously: this will occur only if a newly switched on apparatus 24 or 26 becomes the new time master).

In practice, there may be a time interval between the bus reset and the first instant the timer cycle register is updated. In that case, the time base counter value should be incremented the first instant the timer cycle register is updated by the time master after a bus reset.

In a more complicated solution, the apparatuses could increment the time base counter only when they detect that the time master is not the same after a bus reset. In this way, the W value may be reduced, however, detection of a change of time master increases the complexity of the apparatuses.

The apparatuses could also detect from the update itself whether the bus time has changed discontinuously (given the accuracy of the clock rate specification, the update can only differ plus or minus one from the content of the timer register, so detection of a change of more than a threshold value of, say, 2 can be used to increment the time base counter). However, this may lead to inconsistencies between different apparatuses.

Treatment of late messages

The asynchronous transmission protocol implements a time-stamp mechanism for data types, such as MPEG, that require a constant (jitter free) transport delay. The general idea is that a transmitter attaches a time stamp to each packet that indicates the moment (with respect to bus time) at which a receiver should deliver that packet to its host system. The transmitter computes the stamp such that its value minus the current time is always greater than the maximum delay any packet would experience under normal circumstances.

In this situation all packets arriving at a receiver have a stamp value referring to some future moment. However, there are exceptional situations where this rule may be broken. As an example, consider the loss of cycle start packet and/or a full bus reset. Packets may be held up in a transmitter for so long that when they are finally transmitted and received they arrive too late for proper delivery.

An application level packet (e.g. an MPEG-TP) that arrives too late at a receiver for properly timed delivery is called a late packet. Since the time stamp is just a value of for example 20 bits without a precisely defined semantic interpretation it is not clear how to determine exactly when a packet is late. For example: a stamp that refers to a moment 1 msec in the past can also be interpreted as a stamp referring to a moment 31 msec in the future (when the clock frequency is such that a 20 bit value wraps around in a 32 msec window).

To solve this, the 32 msec window is divided into a "late" part with a duration of 4 msec and an "early" part of 28 msec. The boundary between the two parts is always the current bus time (Cycle Timer Register (CTR) value). The arrival time of an application level packet is defined as the bus time at which the last bit of the bus packet containing the last bit of the application packet arrives (i.e. all bits of the application packets have been received and the CRC (Cyclic Redundancy Code) has been checked).

An application packet with arrival time A is late if and only if its time stamp value falls within the interval |A−4 msec.A); otherwise it is early. The 4 msec interval is exactly 32 cycles or 32*3072 clock ticks of the 24.576 MHz clock.

Early packets will be delivered at the time indicated in the stamp whenever possible. Handling of late packets is implementation (and perhaps application) dependent for example, it can be delivered anyway, as soon as possible, or just thrown away.

The invention as described by way of example by use of the drawing provides for a system for example provides a constant time delay between inputting and outputting, as measured against a time measured by the timing means. The progression of the time indicated by the timing means can exhibit unpredictable discontinuities. This is because the time of inputting and the time of outputting cannot then be measured with respect to the same time scale. In the system according to the invention it is possible to overcome the effects of such discontinuities.

What is claimed is:

1. A system, comprising:
   an input;
   an output;
   timing means for associating a time-stamp with data inputted at the input and for outputting said data at the output when a time indicated by the timing means is in a predetermined relation with the time-stamp;
   potential discontinuity signalling means for signalling a potential discontinuity in a progression of the time indicated by the timing means; and
   time correction means for correcting the predetermined relation when a potential discontinuity is signalled.

2. A system according to claim 1, wherein the timing means comprises:
   an input timer register;
   an output timer register;
   incrementing means for periodically and individually incrementing the input and output registers; and
   a plurality of synchronizing means, each for synchronizing the input timer register with the output timer register;
   wherein the potential discontinuity signalling means is configured to detect when one of the plurality of synchronizing means takes over synchronizing from another one of the plurality of synchronizing means and to signal the potential discontinuity when it detects that one of the plurality of synchronizing means takes over synchronizing from another one of the plurality of synchronizing means.

3. A system according to claim 2, wherein:
   the input and the input timer register are included within a transmitter;
   the output and the output timer register are included within a receiver;
   the data and the time-stamp are transmitted from the transmitter to the receiver via a bus which connects the transmitter and receiver and at least one other apparatus; and,
   the transmitter transmits a code indicating a number of potential discontinuities signalled prior to inputting the data via the bus in association with the time-stamp.

4. A system according to claim 3, wherein the receiver includes the time correction means, which is configured to compare the code with a local count of potential discontinuities, and to correct the predetermined relation when the local count does not match the code.

5. A system according to claim 4, wherein the time correction means includes a discontinuity storage means for storing a continuity amplitude which represents the amplitude of an effect on the time progression of at least a most recently signalled potential discontinuity, and is configured to correct the predetermined relation according to this amplitude.

6. A system according to claim 5, wherein at least two most recent amplitudes are stored in the discontinuity storage means.

7. A transmitter for transmitting data via a bus, the transmitter comprising:
   an input timer register which produces an indication of a progression of time;
   incrementing means for periodically incrementing the input timer register;
   updating means for updating said input timer register according to a synchronization signal;
   an input;
   an output connected to the bus;
   means for associating data inputted at the input with a time-stamp obtained from the input timer register, and for outputting said data at the output in combination with the time-stamp;
   potential discontinuity signalling means for signalling potential discontinuities in the progression of the time indicated by the input timer register;
   a discontinuity counter for counting the number of potential discontinuities signalled by the potential discontinuity signalling means; and
   means for transmitting a code indicating said count via the bus in association with the time-stamp.

8. A transmitter according to claim 7, wherein:
   the potential discontinuity signalling means includes a plurality of synchronizing means, each for generating a synchronization signal; and
   the potential discontinuity signalling means is configured to detect when one of the plurality of synchronizing means takes over generating the synchronization signal from another one of the plurality of synchronizing means and to signal a potential discontinuity when it detects that one of the plurality of synchronizing means takes over generating the synchronization signal from another one of the plurality of synchronizing means.

9. A receiver for receiving data from a bus, the receiver comprising:
   an output timer register;
   incrementing means for periodically incrementing the output timer register;
   updating means for updating said output timer register according to a synchronization signal;
   an input connected to the bus;
   an output;
   means for outputting at the output data received at the input, when a time indicated by the output timer register is in a predetermined relation with a time-stamp received from the input;
   potential discontinuity signalling means for signalling potential discontinuities in a progression of the time indicated by the output timer register;
   a discontinuity counter for counting the number of potential discontinuities signalled by the potential discontinuity signalling means; and,
   time correction means for correcting the predetermined relation when the local count does not match a count of potential discontinuities indicated by a code received in association with the time-stamp.

10. A receiver according to claim 9, wherein:
    the potential discontinuity signalling means includes a plurality of synchronizing means, each for generating a synchronization signal; and, the potential discontinuity signalling means is configured to detect when one of the plurality of synchronizing means takes over generating the synchronization signal from another one of the plurality of synchronizing means and to signal a potential discontinuity when it detects that one of the plurality of synchronizing means takes over generating the synchronization signal from another one of the plurality of synchronizing means.

11. A receiver according to claim 9, wherein the time correction means includes a discontinuity storage means for storing a continuity amplitude which represents the amplitude of an effect on the time progression of at least a most recently signalled potential discontinuity, and is configured to correct the predetermined relation according to this amplitude.

12. A receiver according to claim 10, wherein the time correction means includes a discontinuity storage means for storing a continuity amplitude which represents the amplitude of an effect on the time progression of at least a most recently signalled potential discontinuity, and is configured to correct the predetermined relation according to this amplitude.

* * * * *